United States Patent
Tsuchiya

Patent Number: 6,129,263
Date of Patent: Oct. 10, 2000

[54] MOUNTING METHOD OF BONDING INSERT MATERIAL AND JIG USED IN THE METHOD

[75] Inventor: Masaki Tsuchiya, Yokkaichi, Japan

[73] Assignee: Daido Tokushuko Kabushiki Kaisha, Japan

[21] Appl. No.: 09/169,149

[22] Filed: Oct. 9, 1998

[30] Foreign Application Priority Data

Oct. 13, 1997 [JP] Japan ................... 9-296309

[51] Int. Cl.⁷ .................... B23K 35/12; B23K 37/00
[52] U.S. Cl. .................. 228/255; 228/44.3; 228/44.5
[58] Field of Search .................... 228/44.3, 44.5, 228/225

[56] References Cited

U.S. PATENT DOCUMENTS

| | | | |
|---|---|---|---|
| 3,668,359 | 6/1972 | Emmerson | 219/60 A |
| 4,153,194 | 5/1979 | Leonard, Jr. | 228/29 |
| 5,316,202 | 5/1994 | Murray et al. | 228/5.5 |
| 5,660,317 | 8/1997 | Singer et al. | 228/44.3 |

FOREIGN PATENT DOCUMENTS

| | | | |
|---|---|---|---|
| 402015196 | 1/1990 | Japan | 228/1.1 |
| 363120608 | 8/1994 | Japan | 228/1.1 |
| 406226468 | 8/1994 | Japan | 228/3.1 |

*Primary Examiner*—Patrick Ryan
*Assistant Examiner*—Zidia T. Pittman
*Attorney, Agent, or Firm*—Bacon & Thomas PLLC

[57] ABSTRACT

A bonding insert material mounting method includes the following steps. A bonding insert material having projections of a suitable shape formed on an outer periphery thereof at predetermined intervals is held by half-splittable holder into which joining members can be inserted in such a manner that the projections are held by the holder and that the bonding insert material is disposed at that area of the holder into which the joining members P can be inserted. One end of the holder on an end of one of the joining members is fitted so that one side of the bonding insert material is abutted against an end surface of the one joining member. An end of the other joining member is inserted into the other end of the holder, so that the end of the other joining member is abutted against the other side of the bonding insert material with a predetermined pressing force. Then, the holder is divided into two division members, and the holder is removed from the joining members.

2 Claims, 5 Drawing Sheets

FIG. 13
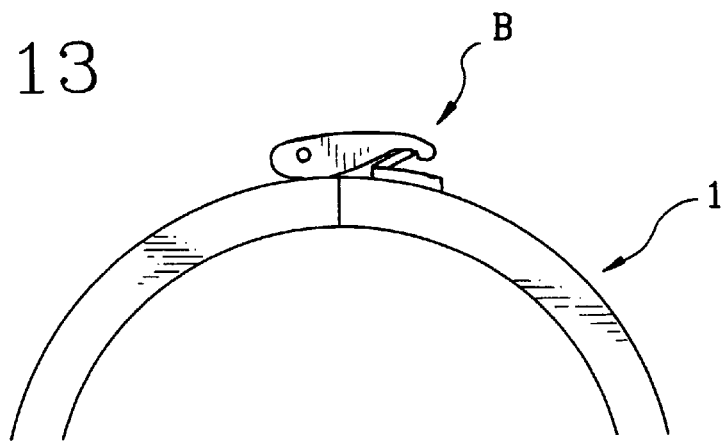
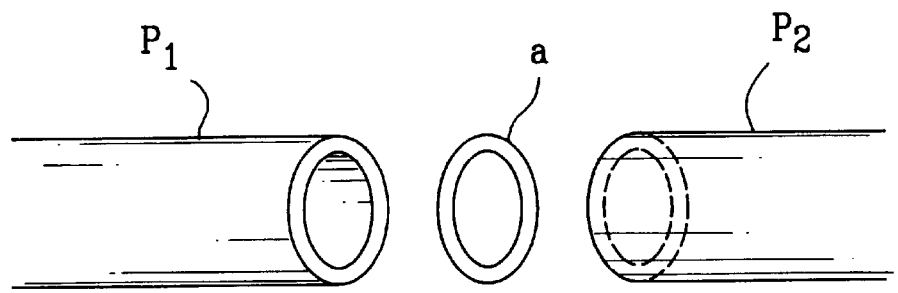
FIG. 14
PRIOR ART
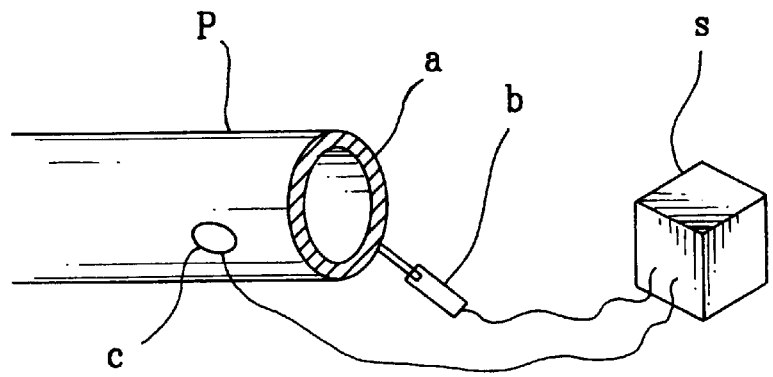
FIG. 15
PRIOR ART

MOUNTING METHOD OF BONDING INSERT MATERIAL AND JIG USED IN THE METHOD

BACKGROUND OF THE INVENTION

1. Field of the Invention

The present invention relates to a method of bonding an insert material and also to a jig used in this method. More specifically, the present invention relates to a bonding material mounting method in which a bonding insert material can be mounted between joining members (to be bonded together) even in an explosion-proof zone, and the invention also relates to a jig used in this method.

2. Description of the Related Art

As shown in FIG. 14, there is known one conventional method of joining pipes or the like together by diffusion, in which a filler (bonding insert material) a, made of a diffusive alloy, is interposed between pipes $P_1$ and $P_2$ to be bonded together, and the two pipes are bonded together by diffusion. For effecting the diffusion bonding using this method, it is necessary to set the filler a between the pipes $P_1$ and $P_2$ in such a manner that this filler will not move before these pipes are bonded together. Namely, the filler a must be precisely mounted on the pipes $P_1$ and $P_2$. This is important particularly in the case of a so-called horizontal bonding in which the pipes P to be bonded together are disposed horizontally.

If the filler a is bonded by an adhesive to an end surface of one of the pipes P so that the filler can be set between the end surfaces of the pipes P, the adhesive is fluidized by heat, produced during the diffusion bonding. Consequently, the adhesive diffuses into the pipes (base metal) to be bonded together, which invites a possibility that the strength of the bonded joint between the pipes is lowered.

As shown in FIG. 15, there may be proposed a method in which the filler a is fused in local portions (spots) thereof, using an electric spark produced by a touch pen b, and is fixedly secured to the end surface of one of the pipes P. In this case, however, if this operation is effected in an atmosphere of flammable gas, there is a risk that the flammable gas is ignited by the electric spark, thereby causing an explosion. And besides, if the filler a is thus fixedly secured to the pipe by the use of the electric spark, there arises the following problems. Namely, a hole is formed in the filler a by the electric spark. Since the filler is liable to be displaced out of position, the filler can not be precisely fixed to the pipe. Because it is necessary to hold the filler a by an appropriate manner during the electric spark fixing, operation time increases and the efficiency of operation is lowered. If the filler fails to be properly held in position, the filler is displaced out of position, as described above. In FIG. 15, reference character c denotes an earth electrode, and reference character s denotes a power source of touch pen.

SUMMARY OF THE INVENTION

It is an object of the present invention to provide a bonding insert material mounting method which does not lower the strength of a joint portion, and can be used even in an explosion-proof zone.

Another object is to provide a jig used in this method.

According to a first aspect of the present invention, there is provided a bonding insert material mounting method comprising the steps of: holding a bonding insert material having projections of a suitable shape formed on an outer periphery thereof at predetermined intervals by a multi-splittable holding device into which joining members can be inserted, in such a manner that the projections are held by the holding device and that the bonding insert material is disposed at that area of the holding device; fitting one end of the holding device on an end of one of the joining members, so that one side of the bonding insert material is abutted against an end surface of the one joining member; inserting an end of the other joining member into the other end of the holding device, so that the end of the other joining member is abutted against the other side of the bonding insert material with a predetermined pressing force; and dividing the holding device into a plurality of division members, and removing the holding device from the joining members.

According to a second aspect of the invention, there is provided a bonding insert material bonding method comprising the steps of: fitting one end of a multi-splittable guide member, into which joining members can be inserted, on an end of one of the joining members; inserting a bonding insert material into the guide member from the other end of the guide member, while guiding the bonding insert material by the guide member, so that one side of the bonding insert material is abutted against an end surface of the one joining member; fitting the other joining member into the guide member from the other end of the guide member, so that an end surface of the other joining member is abutted against the other side of the bonding insert material with a predetermined pressing force; and dividing the guide member into a plurality of division members, and removing the guide member from the joining members.

According to a third aspect of the invention, there is provided a bonding insert material mounting method for use in a bonding method in which joining members are fed vertically, the bonding method comprising the steps of: fitting a lower end of a multi-splittable guide member, into which the joining members can be inserted, on an end of the lower joining member; inserting a bonding insert material downwardly into the guide member from an upper end of the guide member, while guiding the bonding insert material by the guide member, so that the bonding insert material is caused to rest on an end surface of the lower joining member; fitting the upper joining member into the guide member from the upper end of the guide member, so that an end surface of the upper joining member is abutted against an upper side of the bonding insert material with a predetermined pressing force; and dividing the guide member into a plurality of division members, and removing the guide member from the joining members.

According to a fourth aspect of the invention, there is provided a bonding insert material bonding method in which there is used a bonding insert material having retaining claws for retaining engagement with an end of a joining member, the method comprising the steps of: retaining the retaining claws of the bonding insert material on an end of one of joining members; and abutting an end of the other joining member against the bonding insert material with a predetermined pressing force.

A jig of the present invention, used in the bonding insert material mounting method, is a multi-splittable jig for holding a bonding insert material having projections of a suitable shape formed on an outer periphery thereof at predetermined intervals, and the jig holds the bonding insert material in such a manner that the projections are held by the jig and that the bonding insert material is disposed at that area of the jig into which joining members can be inserted.

More specifically, the jig of the present invention, used in the bonding insert material mounting method, comprises a multi-splittable inner member into which the joining member can be inserted, a multi-splittable outer member into which the joining member can be inserted, and a fastening device for fastening the inner and outer members together. The projections of the suitable shape, formed on the outer periphery of the bonding insert material, are held by a holding portion. The holding portion is formed at a peripheral portion of the outer member formed around a joining member-inserting portion thereof.

In the bonding insert material mounting methods of the present invention, the bonding insert material can be mounted between the joining members without the use of an adhesive and an electric spark. Therefore the strength of the joint portion, formed between the a plurality of joining members, is not be lowered, and these bonding methods can be used even in an explosive-proof zone.

BRIEF DESCRIPTION OF THE DRAWINGS

In the accompanying drawings:

FIG. 13 is a plan view of a portion of a splittable jig held in an integrally-combined condition by a buckle;

FIG. 14 is a perspective view showing a filler located between pipes to be joined together; and FIG. 15 is a view showing a method of bonding a filler on a pipe by an electric spark.

DETAILED DESCRIPTION OF THE PREFERRED EMBODIMENTS OF THE INVENTION

Preferred embodiments according to the present invention will now be described with reference to the accompanying drawings, but the present invention is not to be limited to these embodiments.

First Embodiment

Figure 1:
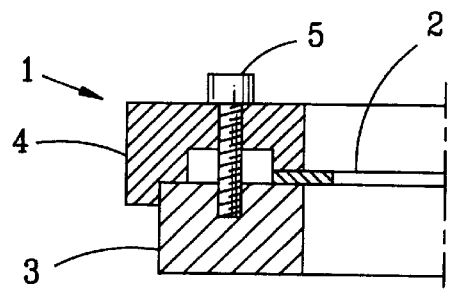
FIG. 1 is a cross-sectional view of a jig used in a first embodiment of the present invention.
Figure 2A:
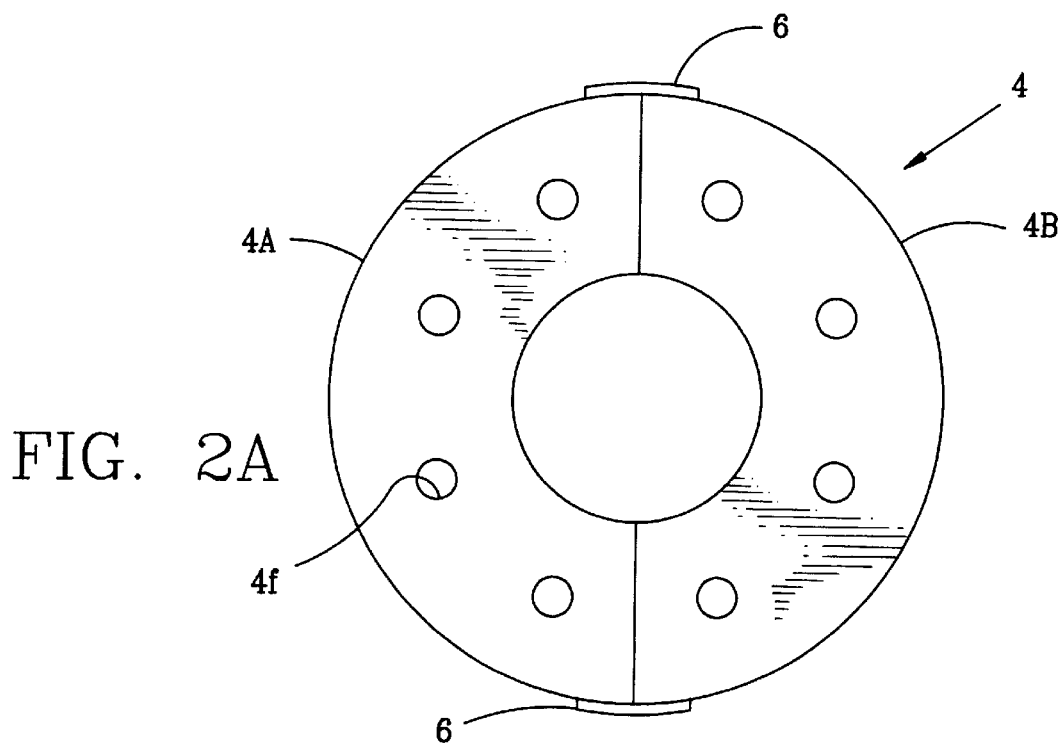
FIGS. 2A and 2B are plan views of inner and outer members of the jig, respectively.
Figure 2B:
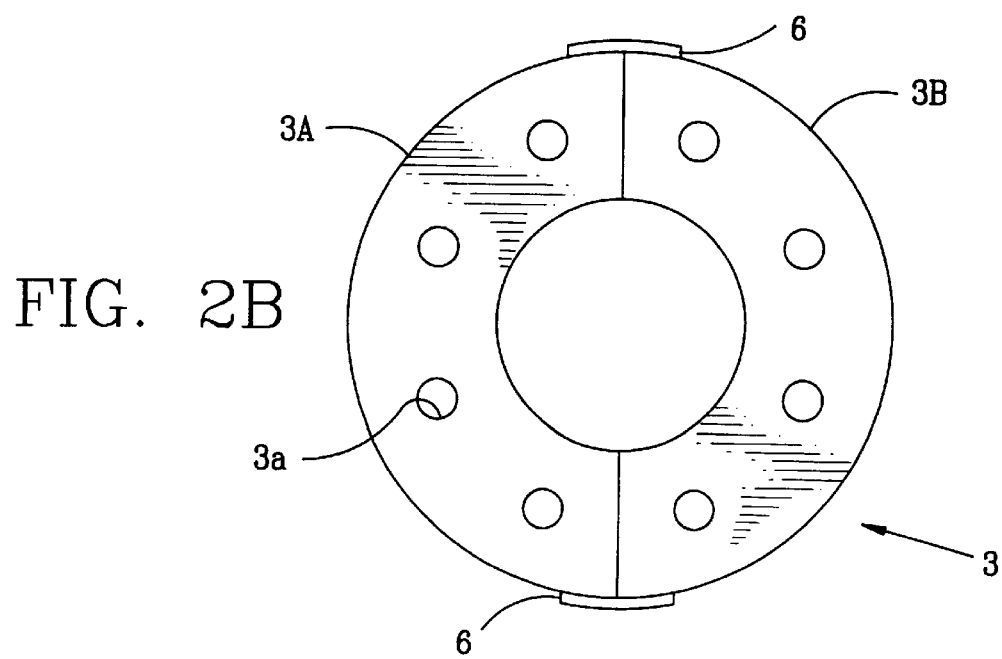
Figure 3:
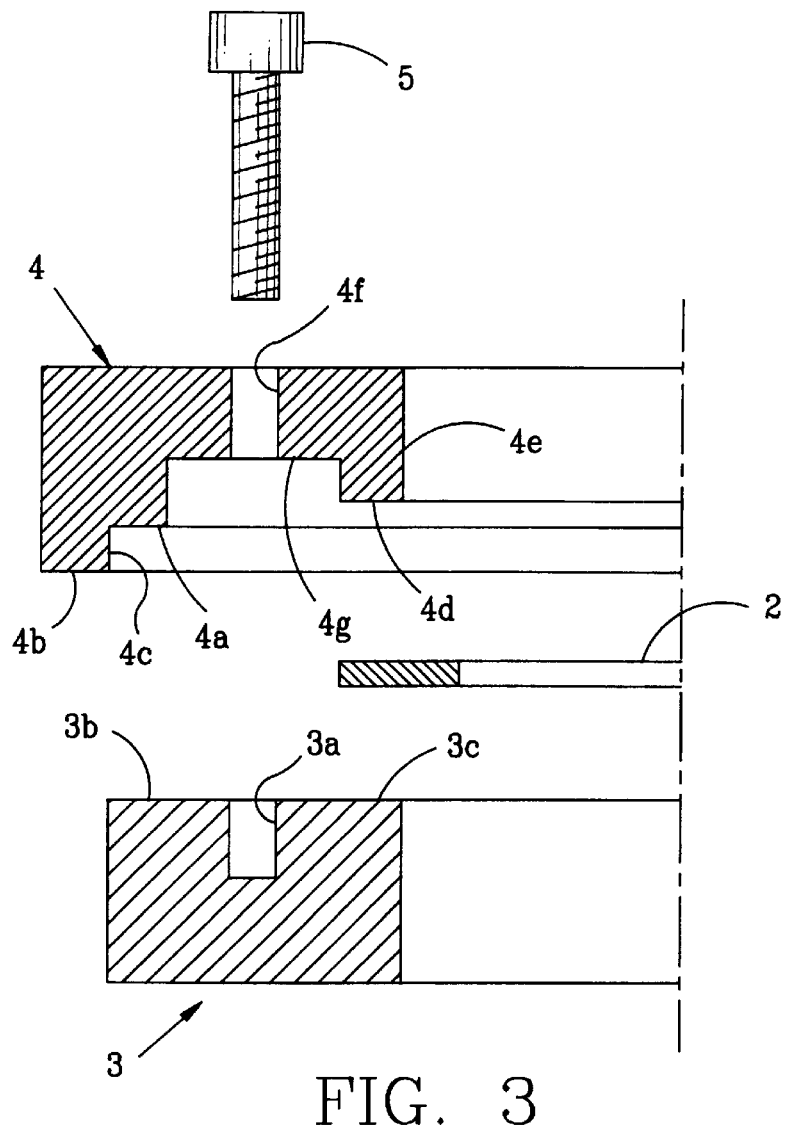
FIG. 3 is an exploded, cross-sectional view of the jig.
Figure 4:
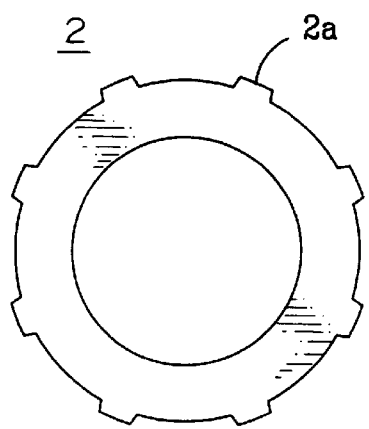
FIG. 4 is a plan view of a filler 2 used in the first embodiment.

FIG. 1 is a cross-sectional view of a bonding insert material bonding jig (hereinafter referred to merely as "jig") 1 used in a bonding insert material mounting method according to a first embodiment of the invention, FIGS. 2A and 2B are plan views of the jig 1, and FIG. 3 is an exploded, cross-sectional view of the jig 1. FIG. 4 is a plan view of a filler (bonding insert material) 2 used in this method. Although this first embodiment is used mainly for a so-called horizontal bonding in which pipes P to be bonded together by diffusion are disposed horizontally, it can be applied to the cases where the pipes P are disposed vertically or are inclined.

The jig 1 has a ring-like inner member 3 split into halves (division members) 3A and 3B, a ring-like outer member 4 which is split into halves (division members) 4A and 4B, and is to be abutted against the inner member 3, and a predetermined number of bolts 5 which fasten the inner and outer members 3 and 4 together in such a manner that the outer member 4 is abutted against the inner member 3. The inner member 3 consisting of the division members 3A and 3B, as well as the outer member 4 consisting of the division members 4A and 4B, is formed into an integral or unitary construction by suitable integrally-connecting device such as adhesive tapes 6. Incidentally, the inner member 4 and the outer member 3 may be three or more division members, respectively.

A predetermined number of (eight in the illustrated embodiment) threaded holes 3a are formed at a predetermined pitch in that portion of the inner member 3 to be abutted against the outer member 4, and are arranged in a circle concentric to the inner member 3, and the bolts 5 are threaded into these threaded holes 3a, respectively (see FIG. 2B).

As shown in FIG. 3, the outer member 4 includes a fitting portion 4c, an abutment surface 4a, and a predetermined number of bolt insertion holes 4f. The fitting portion 4c is formed in an outer peripheral portion 4b thereof, and has an abutment surface 4a of a suitable width for abutment against an outer peripheral portion 3b of the inner member 3. The holding portion 4e is formed at an inner peripheral portion thereof, and has a holding surface 4d of a suitable width for cooperating with an inner peripheral portion 3c of the inner member 3 to hold the filler 2 therebetween. The predetermined number of bolt insertion holes 4f are formed through the outer member 4 so as to be aligned respectively with the threaded holes 3a formed in the inner member 3. A recess 4g is formed between the abutment surface 4a and the holding surface 4d. When the inner and outer members 3 and 4 are fastened together by the bolts 5 as shown in FIG. 1, the holding portion 4e can exert a suitable holding force because of the provision of this recess 4g. For -illustration and description purposes, the thickness of the filler 2 and the amount of projection of the filler 2 from the periphery, are shown in an exaggerated manner in FIG. 1.

As shown in FIGS. 1 and 4, the filler 2 has a width corresponding to the thickness of the pipes P to be joined together. The filler includes a predetermined number of (eight in the illustrated embodiment) tabs (projections) 2a formed on the outer periphery thereof at predetermined intervals. These tabs 2a are held between the inner and outer members 3 and 4 of the jig 1. The height of the tabs 2a is about 2 to 3 mm.

Figure 5:
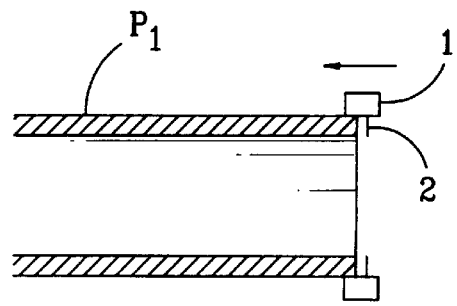
FIG. 5 is a view explanatory of a process of bonding the filler in the first embodiment, showing a condition in which the jig is fitted on an end of a pipe.

Next, a method of bonding the filler 2 between the pipes $P_1$ and $P_2$, using the jig 1 of the above construction, will be described with reference to FIGS. 5 to 7. For illustration and description purposes, a gap is formed between the filler 2 and an end surface of each pipe P in FIGS. 5 to 7.

(1) The division members 3A and 3B of the inner member 3 are integrally combined together by the adhesive tapes 6, and also the division members 4A and 4B of the outer member 4 are integrally combined together by the adhesive tapes 6.

(2) The tabs 2a of the filler 2 are placed in position on the inner member 3.

(3) The outer member 4 of the jig 1 is placed on the inner member 3, so that the tabs 2a of the filler 2 are held between the inner and outer members 3 and 4.

(4) The inner and outer members 3 and 4 are fastened together by the bolts 5. (see FIG. 1)

(5) The inner member 3 of the jig 1, holding the filler 2, is fitted on the joining end of the pipe $P_1$ (see FIG.

Figure 6:
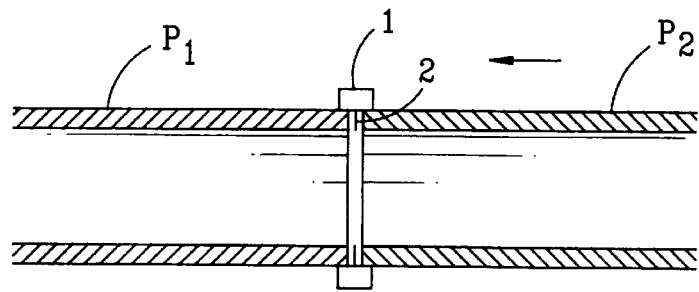
FIG. 6 is a view explanatory of the process of bonding the filler in the first embodiment, showing a condition in which the other pipe is pressed against the filler.

(6) The joining end of the other pipe $P_2$ to be diffusion bonded to the pipe $P_1$ is pressed against the pipe $P_1$ (see FIG. 6).

Figure 7:
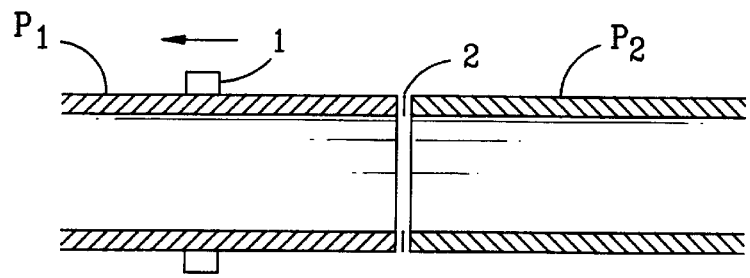
FIG. 7 is a view explanatory of the process of bonding the filler in the first embodiment, showing a condition in which the jig is moved along the pipe.

(7) The jig 1 is moved along the pipe $P_1$ (see FIG. 7). In this case, the height of the tabs 2a of the filler 2 is about 2 to 3 mm, and therefore the tabs 2a of the filler 2 slip from the jig 1. As a result, the filler 2 remains between the pipes $P_1$ and $P_2$. Namely, the filler 2 is mounted between the pipes $P_1$ and $P_2$.

(8) The adhesive tapes 6 are removed from the jig 1, and the jig 1 is split into the halves (division members), and is removed from the pipe $P_1$.

Thereafter, the pipes $P_1$ and $P_2$ are bonded together by diffusion by applying pressure and heat according to an ordinary method, for example, see U.S. Pat. No. 5,699,955.

Thus, in this first embodiment, the filler 2 can be precisely mounted between the pipes $P_1$ and $P_2$ to be diffusion bonded together. This method does not use an electric spark, and therefore can be suitably used in an explosive-proof zone.

Second Embodiment

Figure 8:
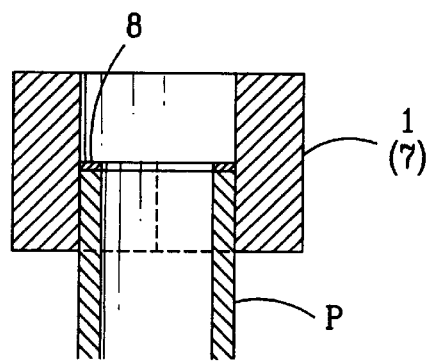
FIG. 8 is a cross-sectional view of a jig used in a second embodiment of the invention.
Figure 9:
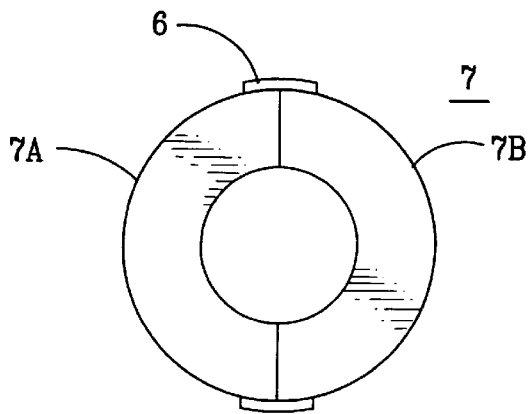
FIG. 9 is a plan view of the jig.
Figure 10:
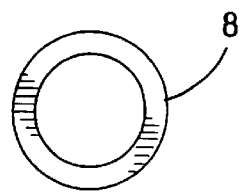
FIG. 10 is a plan view of a filler used in the second embodiment.

FIG. 8 is a cross-sectional view of a jig 1 used in a bonding insert material mounting method according to a second embodiment of the present invention. FIG. 9 is a plan view of the jig 1. FIG. 10 is a plan view of a filler 8 used in this embodiment. Although this second embodiment is used mainly in the case where pipes P to be bonded together by diffusion are disposed vertically, it can be applied to the cases where the pipes P are disposed horizontally or are inclined.

The jig 1 has a ring (guide member) 7 which has a predetermined width and a predetermined thickness, and is constituted by half division members 7A and 7B. An inner diameter of the ring 7 is so determined that the ring 7 can be fitted on the pipes P to be diffusion bonded together. As shown in FIG. 10, the filler 8 has a width equal to the thickness of the pipes P to be diffusion bonded together. Incidentally, the ring 7 may be three or more division members.

Next, a method of bonding the filler between the pipes, using the jig 1 of the above construction, will be described.

(1) The division members 7A and 7B are integrally combined together by adhesive tapes 6 to form the ring 7.

(2) The ring 7 is fitted a predetermined depth on a joining end of the pipe P, and in this condition the ring 7 is fixed to the pipe P, for example, by an adhesive tape (not shown) (see FIG. 8).

(3) The filler 8 is fitted into the ring 7 fixed to the joining end of the pipe P (see FIG. 8).

(4) A joining end of the other pipe (not shown) to be bonded to the joining end of the pipe P is pressed against the joining end of the pipe P.

(5) The adhesive tapes 6, holding the ring 7 in the integrally-combined condition, are removed, and the ring 7 is divided into the division members 7A and 7B, and is removed from the pipes P.

Thereafter, the pipes P are bonded together by diffusion by applying pressure and heat according to an ordinary method.

Thus, in this second embodiment, the filler 8 can be precisely mounted between the pipes to be diffusion bonded together as in the first embodiment. This method does not use an electric spark, and therefore can be suitably used in an explosive-proof zone.

Third Embodiment

Figure 11:
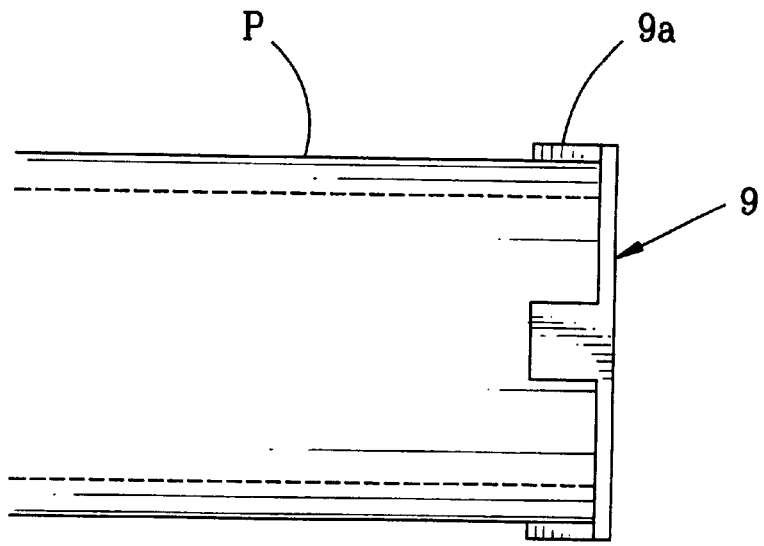
FIG. 11 is a side-elevational view showing a filler used in a third embodiment.
Figure 12:
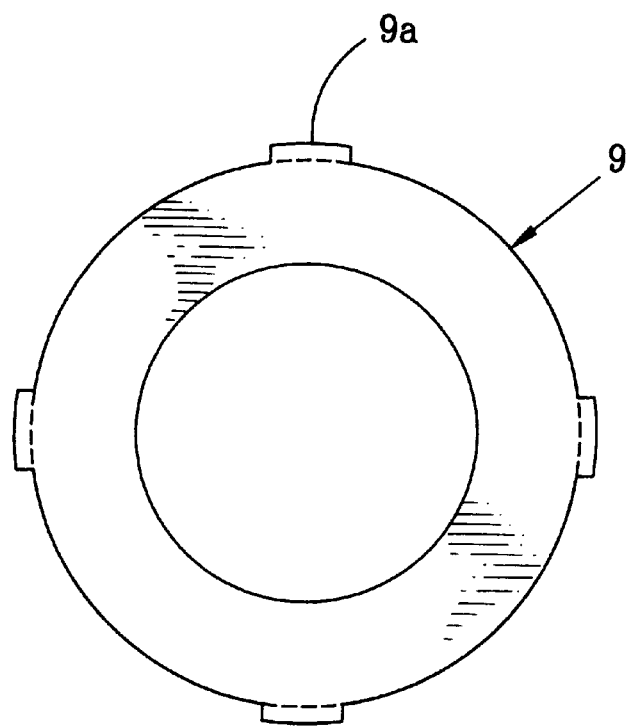
FIG. 12 is a plan view of the filler.

FIGS. 11 and 12 show a filler 9 used in a bonding insert material mounting method according to a third embodiment of the invention. In this third embodiment, a predetermined number of retaining claws 9a for retaining engagement with an end portion of a pipe P are formed on the filler 9 as shown in FIG. 11, and the use of a jig is omitted. Namely, the filler 9 also has the function of a jig.

In this third embodiment, the filler 9 also has the function of a jig, and therefore the retaining claws 9a of the filler 9 can be retainingly engaged with the end portion of the pipe P without the use of a separate jig, and in this condition, merely by pressing an end of the other pipe against the filler, the filler 9 can be mounted between the pipes. Since there is not used any jig for bonding the filler 9 on the pipe P, the removal of such a jig from the pipe is not necessary. Therefore, the efficiency of the operation is markedly enhanced.

Although the embodiments of the present invention have been described above, the invention is not limited to these embodiments, but various modifications can be made. For example, although the above embodiments are directed to the diffusion bonding, the filler-bonding method is not limited to the diffusion bonding method, but can be suitably used for various joining methods using a filler. The integrally-connecting device for integrally combining the division members, for example, of the inner member together is not limited to the adhesive tape, but may constituted by a buckle B (shown in FIG. 13) of a known construction having two portions releasably engageable with each other.

As describe above in detail, in the present invention, there is achieved an excellent advantage that the filler can be precisely mounted between the pipes to be diffusion bonded together even in an explosive-proof zone.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A multi-splittable jig for holding a bonding insert material having projections formed on an outer periphery thereof at predetermined intervals, the jig comprising:

a bonding area into which a pair of members to be joined by a bonding insert material are insertable and the jig is arranged to hold the bonding insert material in such a manner that the projections of the bonding insert material can be held by the jig and the bonding insert material is stationarily positioned at the bonding area of the jig into which the pair of members to be joined are inserted.

2. A jig according to claim 1, further comprising:
  a first multi-splittable jig member having a member-inserting portion into which a first one of the pair of members to be joined is insertable, the first multi-splittable jig member having a peripheral portion formed around the member-inserting portion thereof;
  a second multi-splittable jig member having a member-inserting portion into which a second one of the pair of members is insertable, the second jig member having a holding portion formed around the member-inserting portion thereof;
  at least one fastening device configured for fastening the first a jig member together and the second jig member together; and
  wherein the jig is arranged to hold the projections on the outer periphery of the bonding insert material between the peripheral portion of the first jig member and the holding portion of the second jig member.

* * * * *